United States Patent
Sudhakar

(10) Patent No.: US 7,774,568 B2
(45) Date of Patent: Aug. 10, 2010

(54) CLUSTERED SNAPSHOTS IN NETWORKS

(75) Inventor: Gosukonda Naga Venkata Satya Sudhakar, Bangalore (IN)

(73) Assignee: Novell, Inc., Provo, UT (US)

( * ) Notice: Subject to any disclaimer, the term of this patent is extended or adjusted under 35 U.S.C. 154(b) by 399 days.

(21) Appl. No.: 11/931,340

(22) Filed: Oct. 31, 2007

(65) Prior Publication Data

US 2009/0049259 A1    Feb. 19, 2009

(30) Foreign Application Priority Data

Aug. 13, 2007    (IN) .................. 1719/DEL/2007

(51) Int. Cl.
*G06F 12/16* (2006.01)
(52) U.S. Cl. .................. 711/162; 707/649; 707/657
(58) Field of Classification Search .............. None
See application file for complete search history.

(56) References Cited

U.S. PATENT DOCUMENTS

| | | | |
|---|---|---|---|
| 6,708,227 B1 | 3/2004 | Cabrera et al. | |
| 7,072,915 B2* | 7/2006 | Kaczmarski et al. | 707/204 |
| 7,085,899 B2* | 8/2006 | Kim et al. | 711/161 |
| 2004/0083345 A1 | 4/2004 | Kim et al. | |
| 2004/0267836 A1 | 12/2004 | Armangau et al. | |
| 2006/0053139 A1 | 3/2006 | Marzinski et al. | |
| 2006/0206677 A1* | 9/2006 | Kim et al. | 711/162 |
| 2009/0043971 A1* | 2/2009 | Kim | 711/150 |

OTHER PUBLICATIONS

Phillips, Daniel, "Clustered Snapshots— Detailed Design (Draft)", http://sources.redhat.com/cluster/csnap/cluster.snapshot.design.html, Red Hat Inc.,(Revised May 8, 2004).

* cited by examiner

*Primary Examiner*—Jack A Lane
(74) *Attorney, Agent, or Firm*—Schwegman, Lundberg & Woessner, P.A.

(57) ABSTRACT

Apparatus, systems, and methods may operate to assign a plurality of managing nodes to manage a corresponding plurality of groups of blocks forming a portion of a snapshot volume for copy-on-write execution and snapshot write execution. Further operations include coordinating the copy-on-write execution and the snapshot write execution using a write completion map accessible to the managing nodes. Additional apparatus, systems, and methods are disclosed.

23 Claims, 3 Drawing Sheets

CLUSTERED SNAPSHOTS IN NETWORKS

RELATED APPLICATIONS

The present application claims priority to India Patent Application No. 1719/DEL/2007 filed in the India Patent Office on Aug. 13, 2007 and entitled "CLUSTERED SNAPSHOTS IN NETWORKS;" the disclosure of which is incorporated by reference herein.

BACKGROUND

Data is collected, organized, and processed for virtually every transaction and communication that occurs in today's global economy. The integrity of this information (e.g., the authenticity and/or security of a message) has become important to enterprises and individuals. Consequently, a variety of techniques for securing and replicating information exist, including information backup processes to protect against disk failure and other kinds of catastrophic data loss. Such techniques include taking "snapshots" or making copies of data on a periodic basis, which can give rise to race conditions when a write request occurs at or nearly the same time as a snapshot is taken within a group of nodes.

SUMMARY

In various embodiments, apparatus, systems, and methods to mange clustered snapshots are provided. For example, in some embodiments, snapshot management includes assigning a plurality of managing nodes to manage a corresponding plurality of groups of blocks. The blocks form a portion of a snapshot volume to be used for copy-on-write (COW) and snapshot write execution, each coordinated using a write completion map accessible to the managing nodes. In some embodiments, a cached copy of the write completion map can be accessed to determine whether COW or snapshot write execution are complete with respect to any block, so that blocks can be locked as needed during other file read/write activity. Additional embodiments are described, and along with the foregoing example, will be set forth in detail below.

DETAILED DESCRIPTION

Figure 1:
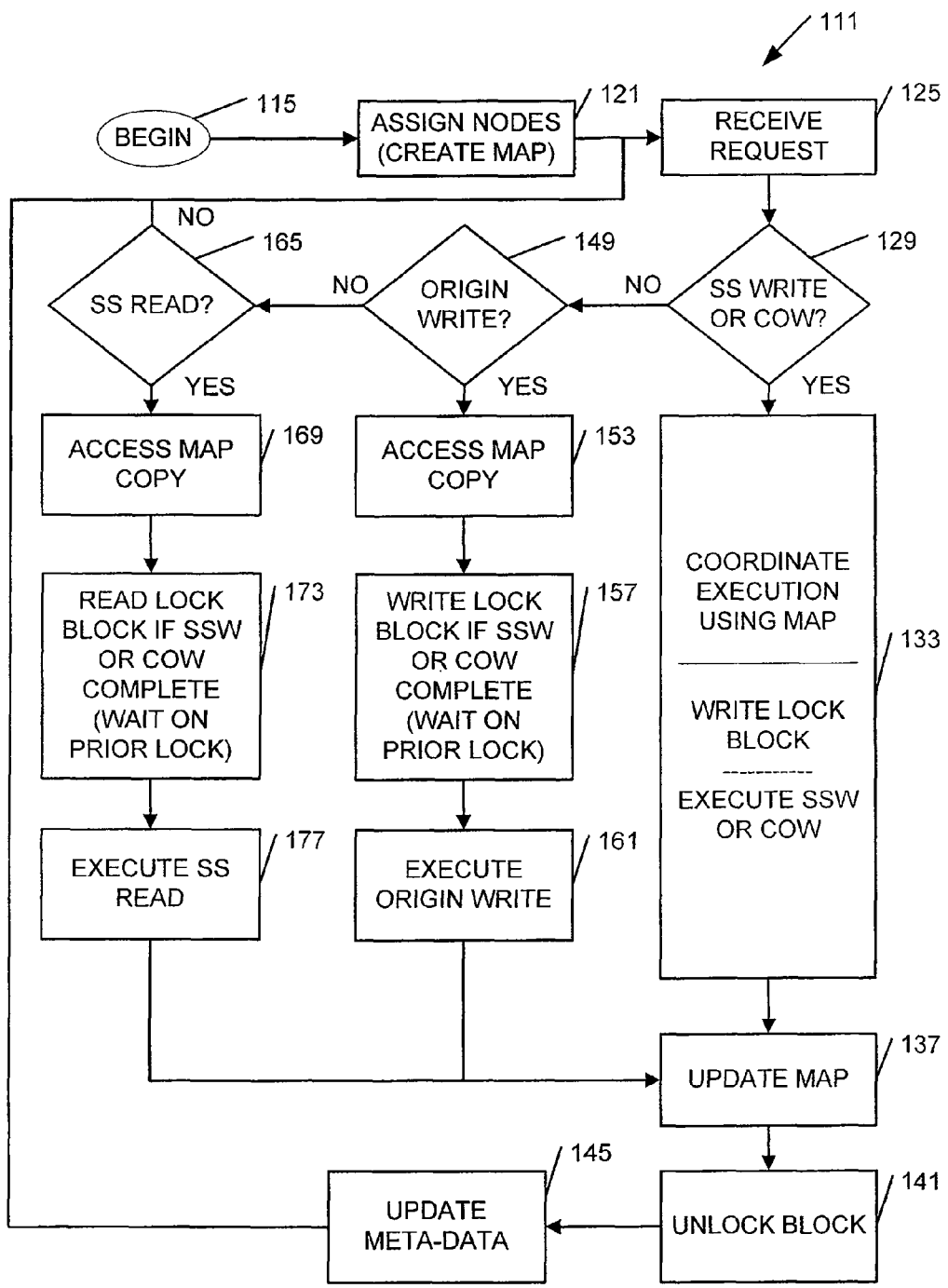
FIG. 1 is a flow diagram illustrating snapshot management methods according various embodiments of the invention.

Within a cluster file system, parallel write operations, i.e., writing to same block by different nodes, are handled by cluster file management applications such as the Oracle® OCFS2 that makes use of a distributed lock manager (DLM). This, while parallel write operations do not often present a problem, there are still cases where discrepancies arise, even with an operating DLM.

In a first example, if origin writes to different blocks occur on different nodes, there can exist a race condition where the same snapshot block is used by each of the nodes for COW operations. Each node may end up accessing the snapshot device to select and write to the same free snapshot block. In a second example, read-write snapshots writing to different blocks on the snapshot volume on different nodes may also end up attempting to use the same free block.

Still further difficulties can arise. In a third example, the meta-data of the mapping, i.e., tracking which origin block is written using a COW operation to which snapshot block, is maintained locally as the COW operation is accomplished on each node. Thus, the COW is carried out on each node for origin writes on those nodes, so that when a read on the snapshot volume is done by an application on a node, the assumption is made that COW mapping for that block is done in another node and that mapping data is not available to the node implementing the read.

In a fourth example, an origin write operation on one node may compete with a simultaneous snapshot read operation by another node. The DLM does not work properly in this case, because the write and read occur on same block. The DLM treats the two requests as independent and does not prevent them from occurring at the same time. If the origin write occurs first, the snapshot read may be redirected to the origin to read new origin data, instead of returning the prior origin data.

In a fifth example, an origin write operation on one node may compete with a simultaneous snapshot write operation by another node. Here again the DLM does not work properly, because when the COW is in progress, it consumes a new block, while the snapshot write can consume another new block. This can create an incorrect mapping result if the COW operation completes after the snapshot write completes. If there is no coordination, a race condition can result, so that the snapshot write that creates a new block on the snapshot store to hold the data being written also modifies the COW mapping on that node to point to the newly-created snapshot block. In this case, both nodes will have different COW mapping, leading to an incorrect cluster snapshot, and data is lost due to the race condition.

Prior attempts to resolve these difficulties teach the use of a single server to manage the snapshot process. For example, the Redhat® CSNAP (Caucus snapshot) module implements a client-server architecture where all significant snapshot management occurs within the snapshot server. For a write request to the origin, the client sends a message to the snapshot server instructing it to ensure that the write will not interfere with any snapshot by copying data from the origin to snapshot store if necessary. The server signals that it has accomplished this by acknowledging the message, and the client proceeds to carry out the write. A snapshot client handles writes in a similar way, except that the server informs the client in its response which data the client wishes to write, and where it is located in the snapshot store. Depending on the server in this way, for each and every COW and snapshot write operation, burdens the network. In addition, performance worsens as each read and write on the origin or on the snapshot volume addresses the server, and requests a lock or decision in reply.

Some of these challenges may be addressed by the various embodiments herein, which operate to coordinate COW and snapshot write services using a write completion map. In essence, free block management is divided among managing nodes, and a bit map, readily accessible to all the nodes, is used to track COW and snapshot write operations so that free blocks are read, written, and locked at appropriate times.

As used herein, an "application" refers to a set of software instructions, a service, or a system that interacts with data housed at a "data source," which refers to a volume or collection of volumes that house the data for applications.

The terms "local," "remote," "source," and "destination" are relative, which means that when something is designated as being "local" or a "source," then this refers to an entity or resource operating within the environment in which the applications operate against the master data source and volume. Conversely, when something is designated as being "remote" or a "destination," then this refers to an entity or resource operating within an environment where a replicated volume is being maintained.

A "cluster file system" is a distributed file system that is not a single server with a set of clients, but instead a cluster of servers that all work together to provide high performance service to their clients. To the clients the storage cluster is transparent; it is the file system software that deals with distributing requests to elements of the cluster.

A "distributed file system" is the generic term for a client/server or network file system where the data isn't locally attached to a host. There are lots of different kinds of distributed file systems; the Sun Microsystems Inc. NFS (Network File System) and Microsoft® CIFS (Common Internet File System) are the most common distributed file systems today.

A "snapshot" refers to a temporal dependent view of a collection of data. In other words, a data source and applications operating on data being housed in the data source may have a given state of the data as it exists at a particular instant in time captured as a snapshot.

Various embodiments of the invention can be implemented in existing network architectures, directory services, security systems, storage interfaces, operating systems, file system process, backup systems, replication systems, and/or communication devices. For example, in some embodiments, the techniques presented herein are implemented in whole or in part using Novell® network services, proxy server products, email products, operating system products, and/or directory services products distributed by Novell, Inc. of Provo, Utah.

Embodiments of the invention can therefore be implemented in a variety of architectural platforms, operating and server systems, devices, systems, or applications. Any particular architectural layout or implementation presented herein is thus provided for purposes of illustration and comprehension only, and is not intended to limit the various embodiments.

FIG. 1 is a flow diagram illustrating snapshot management methods 111 according various embodiments of the invention. The methods 111 are implemented in a machine-accessible and readable medium. The snapshot management methods 111 are operational over processes within and among networks. The networks may be wired, wireless, or a combination of wired and wireless. The methods 111 may be implemented as instructions, which when accessed by a machine, perform the processing depicted in FIG. 1. Given this context, snapshot management is now discussed with reference to FIG. 1.

In some embodiments, a method 111 of managing clustered snapshots may begin at activity 115, and continue on to activity 121 with assigning a plurality of managing nodes to manage a corresponding plurality (e.g., group) of blocks forming a portion of a snapshot volume for COW and snapshot write execution. At this time, a write completion map can be created, as well as one or more cached copies. The write completion map may be included in an exception store, which may in turn be included in the snapshot volume. A group of blocks may comprise one or more individual blocks. The write completion map may include a set of bits indicating the status of the group of blocks that are managing, perhaps in a one-to-one correspondence, so that the status of a single bit can reflect the status of a single block.

The method 111 may continue with receiving a request at activity 125. If the request is one of either a COW or snapshot write request, as determined at activity 129, the method 111 may continue on to activity 133 with coordinating the COW execution and/or the snapshot write execution using the write completion map, which is accessible to the managing nodes. The method 111 may continue at activity 133 with acquiring a write lock for the block to be written, and then executing the COW or snapshot write operation. It should be noted that whenever locking and unlocking are discussed herein, the referenced blocks are usually locked/unlocked one at a time, as part of a group of blocks that are managed.

At this point, the method 111 may include updating the write completion map for the selected block (e.g., a bit in the map may be used to reflect the status of a single block) when the COW execution or the snapshot write execution is completed at activity 137. Thus, this activity may include updating the status of a write completion bit in the write completion map after completing either the COW execution or the snapshot write execution with respect to one of the blocks that are managed by the managing nodes.

The method 111 may then go on to unlock the locked block at activity 141. The method 111 may continue on to updating mapping meta-data associated with an assigned one of the plurality of managing nodes corresponding to the selected block at activity 145.

If the request received at activity 125 is not for a COW or snapshot write operation, as determined at activity 129, the method 111 may continue on to activity 149 with determining whether the request is for an origin write operation. If it is determined that a request for an origin write operation has been received with respect to a block, then the method 111 may continue on to activity 153 with accessing a copy (e.g., a cached copy) of the write completion map to determine whether any ongoing COW execution or snapshot write execution has been completed with respect to the selected block.

The method 111 may then continue on to activity to 157 to include locking the block (e.g., with a write lock) prior to executing the origin write as part of activity 161 if the write completion map indicates the COW/snapshot execution is complete. Determining whether the COW/snapshot execution is complete may comprise determining whether a bit in the write completion map is set. For example, the bit may be set when the snapshot write operation or COW operation is complete. In most embodiments, the bit is never reset. Instead, a new map is created for a new group of blocks.

If it is determined as part of activity 157 that a prior read lock or a prior write lock has already been acquired with respect to the selected block, then the method 111 may include waiting until the prior read lock or the prior write lock is released before acquiring a new write lock on the selected block. In any case, after the execution of the origin write as part of activity 161, the method 111 may continue on to activities 137, 141, and 145, as described previously.

If the request received at activity 125 is not for an origin write operation as determined at activity 149, the method 111 may continue on to activity 165 with determining whether the request is for a snapshot read operation. If not, then the method 111 may continue on to activity 125 with receiving a subsequent request.

If it is determined that a request for a snapshot read operation has been received with respect to a block as part of activity 165, then the method 111 may continue on to activity 169 with accessing a copy (e.g., a cached copy) of the write completion map to determine whether any ongoing COW execution or snapshot write execution has been completed with respect to the selected block.

The method 111 may then continue on to activity to 173 to include locking the block (e.g., with a read lock) prior to executing the snapshot read as part of activity 177 if the write completion map indicates the COW/snapshot execution is complete. Determining whether the COW/snapshot execution is complete may again comprise determining whether a bit in the write completion map is set.

If it is determined as part of activity 173 that a prior read lock or a prior write lock has already been acquired with respect to the selected block, then the method 111 may include waiting until the prior read lock or the prior write lock is released before acquiring a new write lock on the selected block. In any case, after the execution of the snapshot read as part of activity 177, the method 111 may continue on to activities 137, 141, and 145, as described previously.

Thus, it is now apparent that in some embodiments, the method 111 may include managing locking and unlocking a selected one of plurality of blocks using an assigned one of the plurality of managing nodes. In addition, the method 111 may include maintaining a copy of the write completion map on each one of the plurality of managing nodes.

By implementing selected portions of the methods illustrated in FIG. 1, some of the race conditions and other difficulties noted previously may be avoided. The race conditions arising due to a common block being selected for write operations conducted on different nodes, as outlined with respect to the first and second examples above, can be avoided as follows.

Imagine that four nodes exist in a particular cluster. Blocks 1,5,9 . . . can be assigned to node 1; blocks 2,6,10 . . . can be assigned to node 2; blocks 3,7,11 . . . can be assigned to node 3; and blocks 4,8,12 . . . can be assigned to node 4. A COW operation on node 1 can use block 1. If another COW operation occurs on node 1, block 5 can be used, and so on. If a simultaneous COW operation occurs on node 2, then block 2 can be used (or if already used, then block 6 can be used, and so on). Thus, different nodes will use different blocks when a COW operation occurs. Thus, block management can be distributed among multiple nodes, and the same free block will therefore not be used by two different nodes at the same time. If a particular node runs out of free blocks because there are too many queries for free space, the node that has run out of blocks can query other nodes for additional free blocks, and then access these free blocks as an alternative to accessing those blocks that is has been assigned to manage. This is permitted because cluster snapshot operations allow nodes to share access to free blocks managed by other nodes.

The circumstances described with respect to the third, fourth, and fifth examples can also be avoided when the methods described herein are implemented. In the case of the fourth example, mapping meta-data (perhaps known in some embodiments as an exception store (ES)) for many blocks may be maintained as a single block in COW-based snapshots. This ES block may be assigned to a managing node, so that any write to the ES will only occur using the managing node.

Thus, the write completion map can be implemented as a bit map for all blocks in the origin where each bit represents the completion status of a COW/snapshot write for a single block. If a particular COW/snapshot write operation is not complete, as determined by accessing the map, then a read on the snapshot volume for that block is directed to read the original block on the origin volume. However, if the COW/ snapshot write is complete, then applications requesting read operations for that block in the snapshot volume are directed to the new COW (or snapshot written) block on the snapshot volume. There may be a write completion (bit) map for each snapshot in the ES, perhaps saved in the COW store in free space, separate from the origin volume.

The results noted in examples four and five above can also be avoided. This is because any snapshot read that occurs prior to a bit being set in the map will ask the associated managing node to read lock the selected block. Similarly, COW and snapshot write operations will write lock the block if the corresponding bit is not set in the map. If there is already a read lock on a selected block, then another read lock can still proceed. If there is a write lock on the selected block, then a read lock will not be able to proceed. If there is any read lock or any write lock already acquired for a selected block, then any write lock will wait till the locks are released.

In most embodiments, there is a single (master) managing node for the entire volume across a cluster, and each node in the cluster acts as a (local) managing node for a group of blocks in the volume. When a write lock that has previously been acquired is unlocked by an origin COW or snapshot write operation, then prior to unlocking, the local managing node can request the master managing node to update the map (e.g., a status bit in the map) for the selected block, and also to update the mapping meta-data given by the writing node. The writing node can give the meta-data directly to the master managing node for recordation, or to the local managing node, which can in turn pass it on to the master managing node.

Distributing block management can increase cluster throughput in many ways. For example, the labor can be divided among the nodes according to the ratio of the (total number of nodes)/(total number of blocks), with assignments of blocks 1-4 to node 1, and blocks 5-8 to node 2, etc. in a first case. Or blocks 1, 5, . . . to node 1, and block 2, 6, . . . to node 2, etc. in a second case. Of course, other assignment arrangements are possible.

Consider once again a four node cluster, with the blocks assigned as described in the first case above. In this instance, it can be very easy to determine which node is responsible for managing which group of blocks. For example, if the block number of the block to be written gives a remainder of '0' when divided by 4 then node 1 will have been assigned to manage that block. If the remainder is '1' then node 2 will have been assigned to manage the block. The same logic can be used for nodes 3 and 4. It should be noted that the block size need not be the size of the block that applications are addressing. Instead it may be preferable to have larges block sizes since disk scheduling algorithms can group sequential writes that are mapped into one (very large) block.

Each time a write (origin/snapshot) is to be done, the writing node can check to see if the map indicates a bit is set, or not. This information can be obtained by reading the ES. However, the ES does not have to be read each time. First, the data in memory can be checked to see if the bit is set or not. If the bit is set, then that information can be used and the write operation will go on to use a new block that needs no protection, as with a normal write. Otherwise, if the bit is not set in the map, a write lock on the selected block is issued, and then the map is read. This will indicate whether a write has occurred between the two map read operations. If no write has occurred, then the COW/snapshot write can be accomplished, after which the lock can be released.

In most embodiments, there is one cache of the bit map on each local managing node. While the writing node can operate to contact the master managing node instead of reading from shared storage, this is relatively slow. When the bitmap is read from shared storage then it is maintained in memory and is not freed. A new map can be created for each snapshot of the volume.

When a snapshot read is complete, the same logic can be used, i.e., check to see if a bit in the map is set. If set, then a normal snapshot read can occur. If not set, a read lock is issued and the map is read to determine the bit status. If the bit is set, a normal snapshot read can occur. Otherwise (bit not set), an origin read should occur, as the block is not yet used. The read lock is released after the origin read occurs. Of course, if the snapshot device is not active, then the various locks are not needed. This solution works whether all snapshots use a single COW device and share blocks, or not. It also works for non-COW based snapshots. Many other embodiments can be realized.

Figure 2:
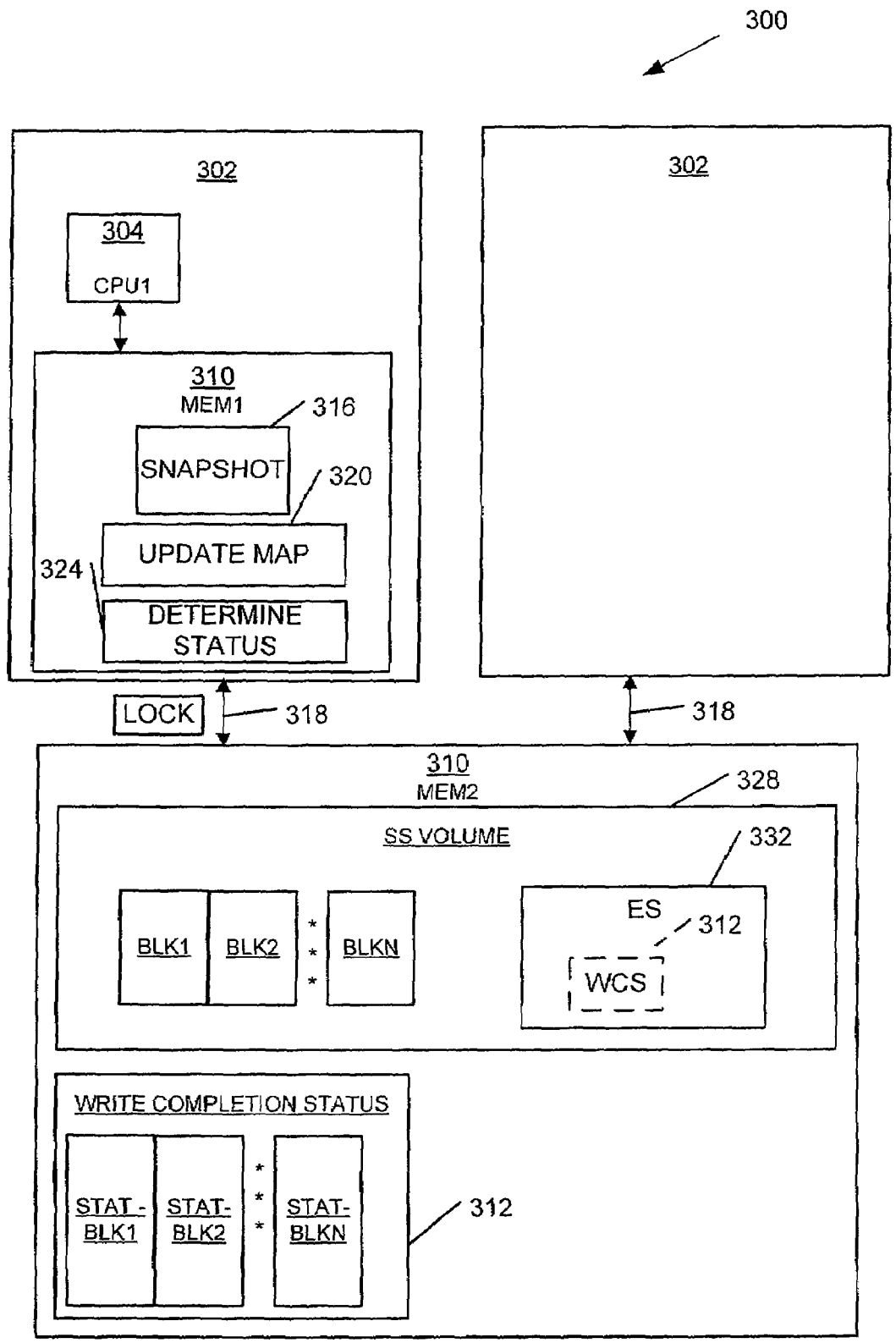
FIG. 2 is a block diagram of a snapshot management apparatus according various embodiments of the invention.

For example, FIG. 2 is a block diagram of a snapshot management apparatus 300 according various embodiments of the invention. The snapshot management apparatus 300 is implemented in a machine-accessible and readable medium and is operational over one or more networks (e.g., the LAN 318 and the WAN 338). The networks may be wired, wireless, or a combination of wired and wireless. The snapshot management apparatus 300 implements, among other things, the processing associated with the snapshot management methods 111 of FIG. 1.

Turning now to FIG. 2, it can be seen that in some embodiments the clustered snapshot management apparatus 300 comprises a memory 310 to store a write completion status map 312, perhaps as part of an exception store 332. The apparatus 300 may include a processor 304 within a managing node 302 to coordinate COW execution and snapshot write execution with respect to an assigned group of snapshot blocks (e.g., BLK1, BLK2) forming a portion of a snapshot volume. The write completion map 312 is to be updated by the managing node 302 after the COW/snapshot write execution is complete, and is accessible to other managing nodes 302 assigned to manage other groups of the snapshot blocks (e.g., BLKN). If the map 312 comprises bits corresponding to a group of blocks, the bits in the map corresponding to the write completion status of a selected group of blocks can be set by the node that is responsible for managing that group of blocks. Other nodes (e.g., the writing node) are not permitted to set the bits in the map 312.

The processor 304 can execute a process 324 to determine the status of a bit (e.g., STAT-BLK1) in the write completion status map 312 with respect to the assigned group of snapshot blocks (e.g., BLK1, BLK2). If the bit is not set, then this means the origin and the snapshot volume are sharing the same block. The processor 304 can issue a command LOCK to lock a block in the assigned group of snapshot blocks (e.g., BLK1, BLK2) if the status of the associated bit is set, and if an origin write operation, a snapshot read operation, or a snapshot write operation is to be executed. If an origin read is to be executed, there is no lock needed, regardless of the map bit status.

While not shown in the figure, the memory 310 and the processor 304 may be included in a single server 302. The memory 310 may include a snapshot volume 328 to store one or more snapshots, such as a snapshot resulting from snapshot write execution.

The apparatus 300 may comprise an execution element 302, such as a server, a terminal, a personal computer, a workstation, or any combination of these. The memory MEM1 and the processor 304 may be included in a single server 302, as shown, or exist as separate hardware elements, perhaps coupled together by a local area network (LAN) 318. Similarly, the memories 310 may be included in a single server 302, or operate as separate units, illustrated in FIG. 3. Modules may comprise hardware, software, and firmware, or any combination of these.

The execution element 302 may comprise a single entity, or several entities in communication with one another, such as one or more Novell® BorderManager® (NBM) proxy servers, Novell® Access Manager™ Linux® Access Gateways, or any intermediary that accomplishes backup process execution.

Figure 3:
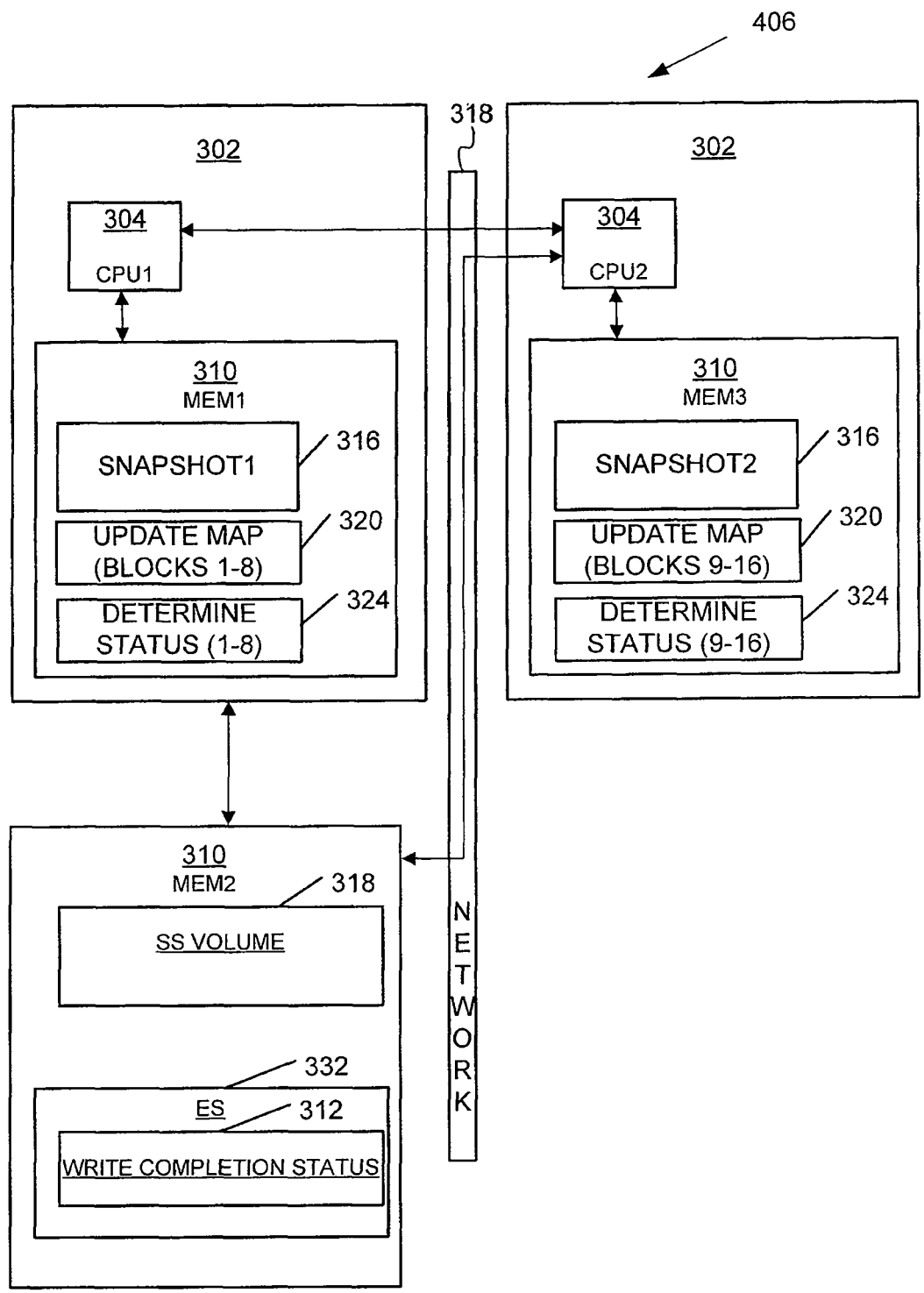
FIG. 3 is a block diagram of a snapshot management system according various embodiments of the invention.

FIG. 3 is a block diagram of a snapshot management system 410 according to various embodiments of the invention. The snapshot management system 406 is implemented in a machine-accessible and readable medium and is operational over one or more networks (e.g., LANs 418 and WAN 438). The networks may be wired, wireless, or a combination of wired and wireless. The snapshot management system 406 includes multiple instances of the apparatus 300, and implements, among other things, the processing associated with the snapshot management methods 111 of FIG. 1.

Turning now to FIG. 3, it can be seen that a clustered snapshot management system 406 may comprise a memory 310 to store a write completion status map 312 as part of an exception store 332. The system 406 may also comprise a plurality of processors 304 within a plurality of nodes 302 to coordinate COW execution and snapshot write execution with respect to a corresponding plurality of assigned groups of snapshot blocks (e.g., see a first group made up of BLK1, BLK2, and a second group made up of BLKN in FIG. 1) forming a portion of a snapshot volume 318. Again, the write completion map 312 is to be updated by one of the plurality of nodes 302 after the COW execution or the snapshot write execution is complete with respect to one of the assigned block. The write completion status map 312 is accessible to each of the plurality of nodes 302.

In some embodiments, the system 406 comprises a plurality of servers 302 to house the plurality of processors 304. The memory 310 and the plurality of processors 304 may form a portion of a symmetric multiprocessing architecture.

Implementing the apparatus, systems, and methods described herein may thus provide improved performance, better data integrity, and a reduced network burden. The improvement in performance may be more noticeable when compared to solutions that do not divide the burden of managing groups of blocks among several nodes when implementing clustered snapshot operations.

In most embodiments, any clustered resource that operates using COW operations can make use of the solution proposed herein. If an rNIC (remote direct memory access (RDMA)-enabled NIC (network interface card)) is used along with non-volatile random access memory (NVRAM), as part of the memory 310, then the ES can be maintained in memory. This may further improve performance.

This Detailed Description is illustrative, and not restrictive. Many other embodiments will be apparent to those of ordinary skill in the art upon reviewing this disclosure. The scope of embodiments should therefore be determined with reference to the appended claims, along with the full scope of equivalents to which such claims are entitled.

The Abstract of the Disclosure is provided to comply with 37 C.F.R. §1.72(b) and will allow the reader to quickly ascertain the nature of the technical disclosure. It is submitted with the understanding that it will not be used to interpret or limit the scope or meaning of the claims.

In this Detailed Description of various embodiments, a number of features are grouped together in a single embodiment for the purpose of streamlining the disclosure. This method of disclosure is not to be interpreted as an implication that the claimed embodiments have more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

The invention claimed is:

1. An apparatus, comprising:
    a memory to store a write completion status map as part of an exception store; and
    a processor within a managing node to coordinate copy-on-write execution and snapshot write execution with respect to an assigned group of snapshot blocks forming a portion of a snapshot volume, wherein the write completion map is to be updated by the managing node after the copy-on-write execution or the snapshot write execution is complete, and wherein the write completion status map is accessible to other managing nodes assigned to manage other groups of the snapshot blocks.

2. The apparatus of claim 1, wherein the processor is to execute a process to determine a status of a bit in the write completion status map with respect to a selected block in the assigned group of snapshot blocks.

3. The apparatus of claim 2, wherein the processor is to issue a command to lock a selected block in the assigned group of snapshot blocks if the status of the bit is set, and if one of an origin write operation, a snapshot read operation, or a snapshot write operation is to be executed.

4. The apparatus of claim 1, wherein the memory and the processor are included in a single server.

5. The apparatus of claim 1, wherein the memory includes a snapshot volume to store a snapshot resulting from the snapshot write execution.

6. A system, comprising:
a memory to store a write completion status map as part of an exception store; and
a plurality of processors within a plurality of nodes to coordinate copy-on-write execution and snapshot write execution with respect to a corresponding plurality of assigned groups of snapshot blocks forming a portion of a snapshot volume, wherein the write completion map is to be updated by one of the plurality of nodes after the copy-on-write execution or the snapshot write execution is complete with respect to a selected block in one of the assigned groups, and wherein the write completion status map is accessible to each of the plurality of nodes.

7. The system of claim 6, comprising:
a plurality of servers to house the plurality of processors.

8. The system of claim 6, wherein the memory and the plurality of processors form a portion of a symmetric multi-processing architecture.

9. A method, comprising:
assigning a plurality of managing nodes to manage a corresponding plurality of groups of blocks forming a portion of a snapshot volume for copy-on-write execution and snapshot write execution; and
coordinating the copy-on-write execution and the snapshot write execution using a write completion map accessible to the managing nodes.

10. The method of claim 9, further comprising:
updating the write completion map when the copy-on-write execution or the snapshot write execution is completed with respect to a selected block in one of the groups of blocks.

11. The method of claim 9, further comprising:
receiving a request for an origin write operation with respect to a selected block in one of the groups of blocks;
accessing a cached copy of the write completion map to determine whether the copy-on-write execution or the snapshot write execution is complete with respect to the selected block; and
locking the selected block prior to executing the origin write if the write completion map indicates the copy-on-write execution or the snapshot write execution is complete.

12. The method of claim 9, wherein determining whether the copy-on-write execution or the snapshot execution is complete comprises:
determining whether a bit in the write completion map is set.

13. The method of claim 9, further comprising:
receiving a request for a snapshot read operation;
accessing a cached copy of the write completion map to determine whether the copy-on-write execution or the snapshot write execution is complete with respect to a selected block in one of the groups of blocks; and
locking the selected block prior to executing the snapshot read operation if the write completion map indicates the copy-on-write execution or the snapshot write execution is complete.

14. The method of claim 9, comprising:
updating a status of a write completion bit in the write completion map after completing one of the copy-on-write execution or the snapshot write execution with respect to a selected block in one of the groups of blocks.

15. The method of claim 9, wherein the write completion map is included in an exception store.

16. The method of claim 15, wherein the exception store is included in the snapshot volume.

17. The method of claim 9, comprising:
managing locking and unlocking a selected block in the groups of blocks using an assigned one of the plurality of managing nodes.

18. The method of claim 9, comprising:
maintaining a copy of the write completion map on each one of the plurality of managing nodes.

19. The method of claim 9, comprising:
prior to unlocking a selected block in the groups of blocks, updating the write completion map status for the selected block; and
updating mapping meta data associated with an assigned one of the plurality of managing nodes corresponding to the selected block.

20. The method of claim 9, comprising:
determining that a prior read lock or a prior write lock has already been acquired with respect to a selected block in the groups of blocks; and
waiting until the prior read lock or the prior write lock is released before acquiring a new write lock on the selected block.

21. A method, comprising:
receiving a request to execute a snapshot write or a copy-on-write;
accessing a copy of a write completion map accessible to a plurality of managing nodes assigned to manage a corresponding plurality of groups of blocks forming a portion of a snapshot volume;
determining that a selected block in the groups of blocks is free;
executing the snapshot write or the copy-on-write; and
updating the write completion map to indicate that execution of the snapshot write or the copy-on-write is complete.

22. The method of claim 21, comprising:
receiving a request for an origin read operation; and
refraining from locking the selected block prior to executing the origin read operation regardless of a state of the write completion map.

23. The method of claim 21, comprising:
determining whether a bit is set in the completion map for the selected block; and
if the bit is not set, acquiring a read lock or a write lock on the selected block prior to executing the snapshot write or the copy-on-write.

* * * * *